Figure 1:
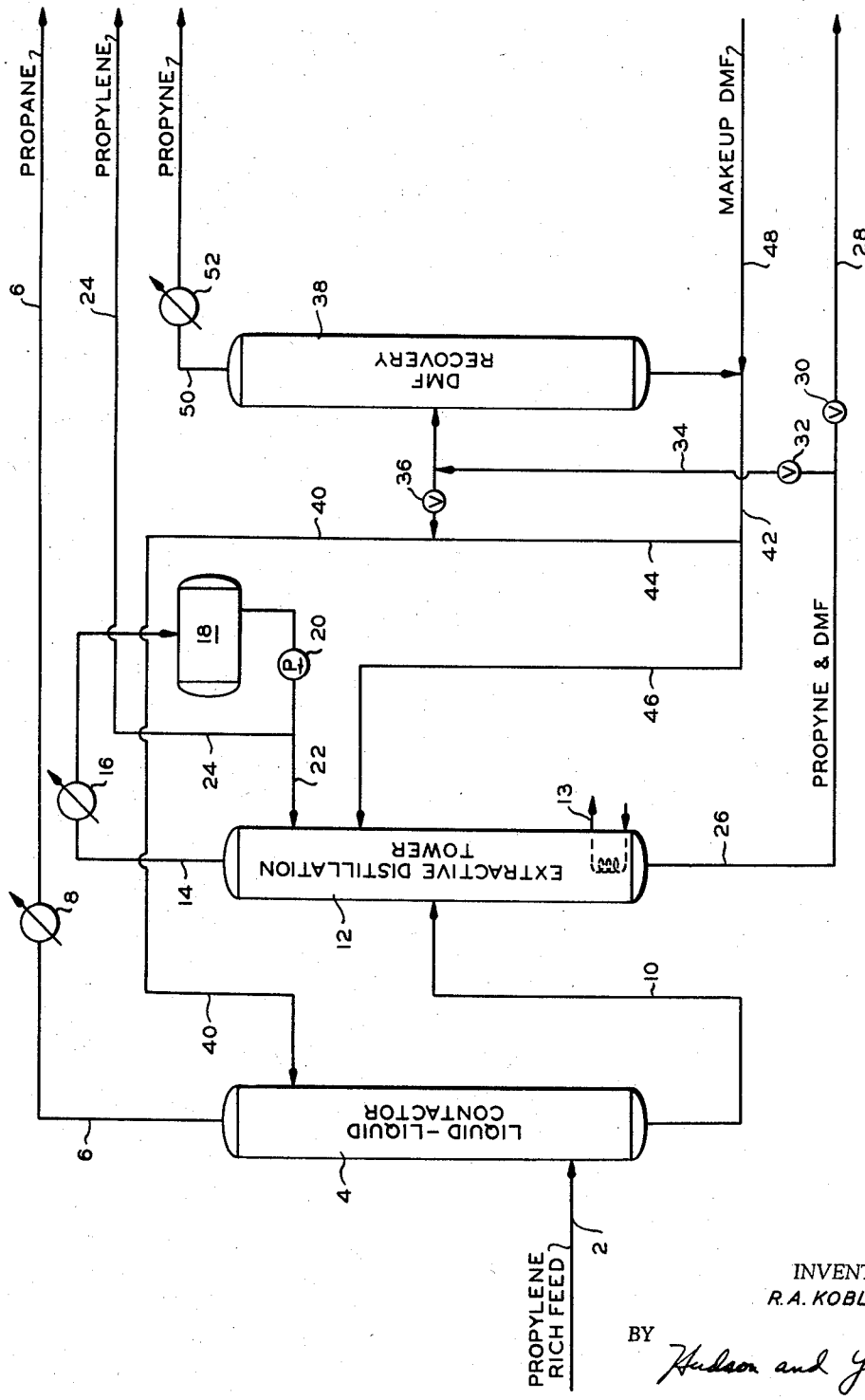

INVENTOR.
R. A. KOBLE

United States Patent Office 2,908,731
Patented Oct. 13, 1959

2,908,731

OLEFIN PURIFICATION BY SOLVENT EXTRACTION

Robert A. Koble, Bartlesville, Okla., assignor to Phillips Petroleum Company, a corporation of Delaware Application June 19, 1957, Serial No. 666,642

15 Claims. (Cl. 260—677)

This invention relates to the treatment of a hydrocarbon mixture to remove one or more components therefrom. In one aspect the invention relates to the recovery of an olefin by solvent extraction from a hydrocarbon mixture comprising an olefin, a paraffin and an alkyne.

In the various processes wherein an olefin is utilized as a feed component it is usually desirable to provide this material in a substantially pure state. Olefins normally produced in refining or other operations usually contain impurities, such as paraffins and acetylene compounds, having boiling points similar to the olefins. For example, hydrocarbon streams rich in propylene may contain propane, ethane, $C_4$ olefins, propyne and allene. When the olefin, such as propylene, is to be used in a catalytic polymerization process the chief impurities which it is desirable to remove are propane and propyne. Conventional methods for effecting the separation of these compounds are complicated and expensive due to the low relative volatility of propylene as compared to propane and the azeotrope formation between propane and propyne and/or allene. For example, when operating at normal temperatures the relative volatility of propylene with respect to propane is 1.1:1 to 1.2:1, which requires a large column and a high reflux ratio when the separation is effected by distillation.

It is an objtect of this invention to provide an improved process for the recovery of olefin compounds from a hydrocarbon mixture.

Another object of this invention is to provide an improved process for separating substantially pure olefin from a hydrocarbon mixture.

Still another object of this invention is to provide an improved process for the recovery of propylene from a refinery hydrocarbon stream.

Yet another object of this invention is to provide an improved process for the recovery of propylene from a hydrocarbon mixture comprising propane, propylene, and propyne.

These and other objects of the invention will become more readily apparent from the following detailed description and discussion.

In carrying out the invention the foregoing objects are achieved broadly by contacting a hydrocarbon mixture comprising an olefin, a paraffin and an alkyne of similar boiling points with dimethylformamide solvent in a liquid-liquid extraction zone, recovering an extract rich in olefin and alkyne, subjecting said extract to contact with additional solvent in an extractive distillation zone, and recovering a substantially pure olefin product.

As used herein the term "similar boiling points" relates to compounds sufficiently close in boiling point to make their separation by conventional fractional distillation difficult or impossible.

In one aspect of the invention the extract is stripped to remove olefin therefrom following which the olefin vapor is contacted first with solvent and then with liquid olefin for the successive removal of alkyne and solvent.

In another aspect of the invention the solvent-rich material from the extractive distillation is stripped to separate the solvent and the alkyne.

In still another aspect of the invention a hydrocarbon mixture comprising an olefin, a paraffin and an alkyne of similar boiling points is subjected to a two stage liquid-liquid extraction with dimethylformamide solvent, the extract from the first stage comprising paraffin, propyne and solvent, the raffinate from the first stage, which constitutes the feed to the second stage, comprising olefin and paraffin, the extract from the second stage comprising olefin and solvent and the raffinate from the second stage comprising paraffin. In this aspect of the invention solvent to the two stages is provided by fractionating the extract from the second stage and/or by stripping the extract from the first stage. In addition the paraffin-rich raffinate from the second stage can be refluxed in contact with the extract in the first stage to aid in the separation of olefin therefrom.

The invention is applicable in general to the treatment of hydrocarbon mixtures containing an olefin, a paraffin and an alkyne, having similar boiling points. The terms "olefin," "paraffin" and "alkyne" as used herein are intended to have their usual meanings and include compounds such as propylene, butenes, isobutene, pentenes, etc., propane, butane, isobutane, pentane, isopentane, etc. and propyne, butynes, pentynes, etc. The invention is particularly applicable in the treatment of refinery gas streams for the purpose of providing a substantially pure olefin feed for use in various processes such as alkylation, polymerization, etc.

Specific mixtures to which the invention applies are propane, propylene, propyne; butane, butene-1 and/or butene-2,3-buten-1-yne (vinyl acetylene), and/or butyne-1; pentane, pentene-1 and/or pentene-2, pentyne-1; and the like.

The invention will be described by particular reference to the system propane, propylene, propyne. This is not intended, however, in any limiting sense and the treatment of other hydrocarbon mixtures containing olefins, paraffins, and alkynes having similar boiling points is also within the scope of the invention.

In carrying out the invention in one embodiment thereof, a refinery stream comprising, for example, propane, propylene and propyne is introduced as a liquid to a contacting zone wherein it is contacted with dimethylformamide.

The feed material can contain various percentages of the named components however usually the propylene is present in an amount of between about 40 and about 90 percent, the propane between about 60 and about 10 percent by weight, the propyne between about 0.5 and about 2 percent and very minor quantities of ethane, $C_4$ olefins, etc., the percentages being by weight.

An extract and a raffinate stream are recovered from the contacting operation, the extract being concentrated in propylene and propyne and the raffinate containing principally propane. The separation of propane from the mixture is effected by virtue of the selective nature of the dimethylformamide, which preferably absorbs the unsaturated compounds. Specifically, with the use of dimethylformamide, the relative volatility of propane with respect to propylene is about 2 to 1 and is even greater for the system propyne-propane. The degree of separation obtained in the liquid-liquid extraction is dependent upon a number of factors including temperature, pressure, feed composition and quantity of solvent employed. In the system propane-propylene-propyne it is necessary to employ a pressure sufficient to maintain the hydrocarbons in a liquid state, usually between about 200 and about 400 p.s.i.g. Usually it is desirable to operate at as low a temperature as possible since increasing temperatures, while favoring solubility of the hydrocarbons in the solvent, have an adverse effect on solvent selectivity. In the recovery of propylene it is usually desirable to operate at a temperature in the range between about −20 and about 100° F. Usually it is preferred to employ a sufficient amount of solvent to provide a contactor solvent-to-feed ratio between about 1 and about 10 to 1.

Following the initial contacting step the propylene-propyne rich extract is introduced into an extractive distillation zone from which there is recovered overhead a substantially pure propylene product, and as a bottom stream a mixture of propyne and dimethylformamide. Three steps are involved in this recovery operation. In the first step the extract entering the extractive distillation zone is stripped of propylene; in the second step propylene vapors ascending through the column are contacted with dimethylformamide to effect removal therefrom of propyne, and in the third step the propylene vapors are further contacted with liquid propylene whereby entrained dimethylformamide is removed, thus providing a propylene product containing as much as 99 percent propylene by weight. In this operation advantage again is taken of the selectivity of the dimethylformamide solvent. In this solvent the relative volatility of propylene with respect to propyne is about 6 to 1. Thus, when the temperature of the material introduced to the extractive distillation zone is increased propylene is preferentially released from the solvent and when the ascending propylene vapors, which contain some propyne, are contacted with dimethylformamide the solvent preferentially absorbs the propyne.

The efficiency of the extractive distillation stage is also a function of the conditions under which this operation is carried out, including temperature, pressure, flow rates and the composition of the propylene-propyne rich extract. The stripping portion of the extractive distillation is accomplished by heating the extract or by a combination of heat and the use of a stripping gas such as propylene or propyne. This operation is usually carried out at a temperature of between about 300 and about 350° F. and at a pressure of between about 200 and about 260 p.s.i.g. Removal of propyne entrained in the propylene gas is effected under similar temperature and pressure conditions and the amount of solvent employed is usually sufficient to provide a solvent-to-propylene ratio of between about 0.2 and about 0.5 to 1 by weight. Scrubbing of the propylene gas is effected usually by contacting said gas with a condensed portion of the propylene product. This operation is carried out at a temperature of about 100 to 120° F. and the quantity of scrubbing material employed is usually between about 0.1 and about 0.3 lbs./lb. of propylene gas.

It is desirable that the solvent which is used in this process be available for reuse and it may be also desirable to recover substantially pure propyne. Recovery of the dimethylformamide is effected by introducing the liquid from the extractive distillation to a fractionation zone wherein dimethylformamide and propyne are separated, the dimethylformamide being returned to the liquid-liquid contacting zone and the extractive distillation step. If it is not desired to reuse the solvent, the liquid from the extractive distillation zone can be discarded and fresh solvent employed.

While operating conditions have been given for the particular system propane-propylene-propyne, it is to be understood that similar conditions can be employed in the treatment of other systems. Optimum conditions for any system are readily determinable within the skill of the art therefore it is believed unnecessary to present such data herein.

In another embodiment of the invention a separation similar to that previously described is effected by subjecting a hydrocarbon mixture containing, for example, propylene, propane and propyne, to a two-stage liquid-liquid contact followed by fractionation and stripping to recover dimethylformamide and components of the hydrocarbon mixture other than propylene. In carrying out this process the hydrocarbon mixture is first introduced into contact with dimethylformamide to provide an extract product containing principally propyne and solvent and a raffinate stream containing principally propane and propylene. The raffinate is introduced to a second liquid-liquid contacting zone wherein it is again subjected to contact with dimethylformamide to provide a raffinate rich in propane and an extract containing propylene and dimethylformamide. The second extract is fractionated to separate the propylene and dimethylformamide with the dimethylformamide being recycled to the contacting steps and the propylene being yielded as product. A portion of the raffinate from the second extract can be returned to the first extraction step, in contact with the extract therefrom, to aid in the separation of propylene. This raffinate can also be introduced along with the extract from the first extraction zone to a stripping zone for the separation of propane and propyne from dimethylformamide.

The degree of separation obtained in this embodiment of the invention is also dependent upon the operating conditions, flow rate and compositions of the various streams. In general, the operating conditions employed are similar to those previously given with suitable adjustments thereof to provide the specific separation desired in each of the two contacting zones.

Figure 2:
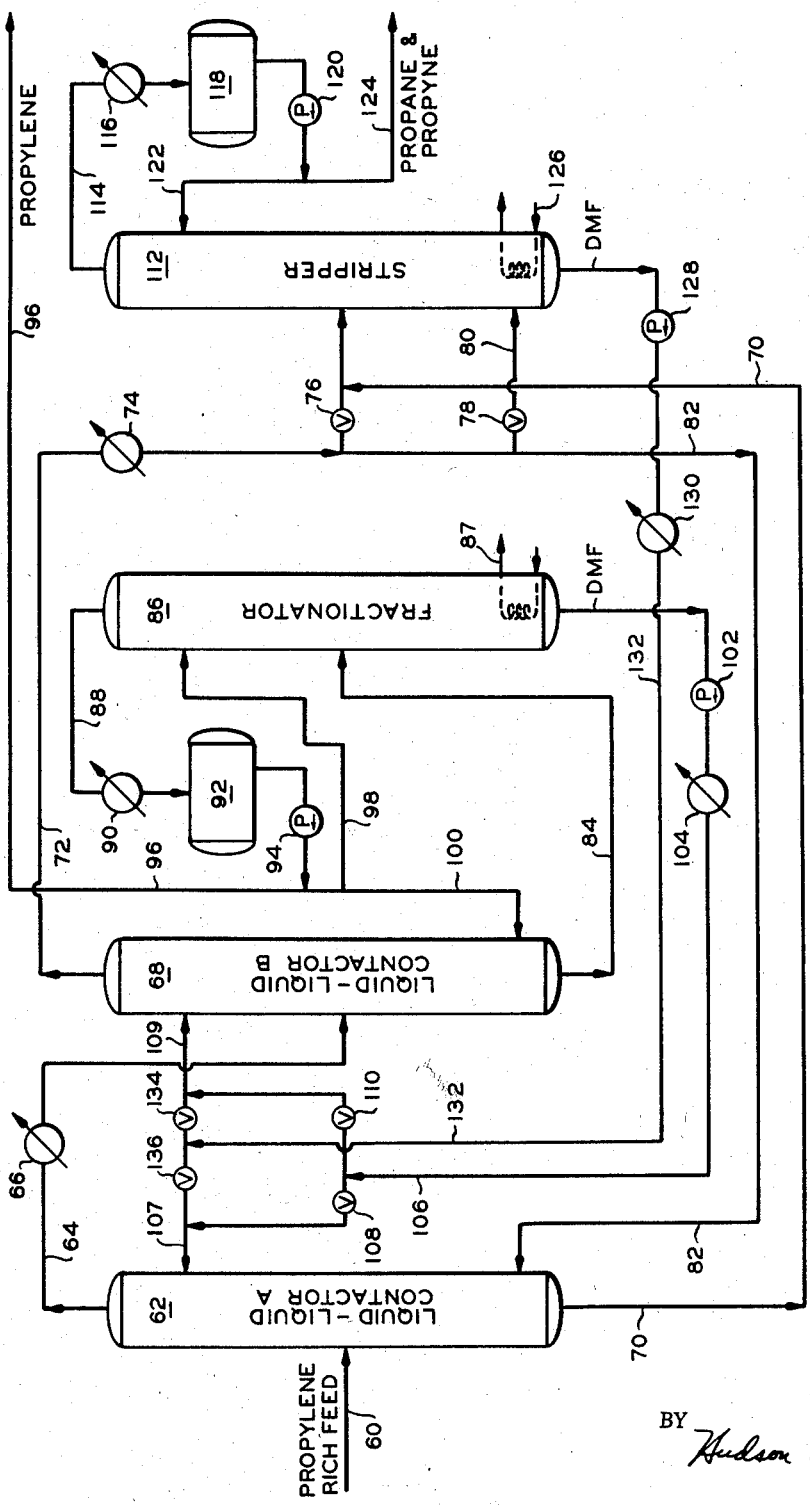

In order to more clearly describe the invention and provide a better understanding thereof reference is had to the accompanying drawings of which, Figure 1 is a diagrammatic illustration of a liquid-liquid contactor and an extractive distillation tower suitable for carrying out one embodiment of the invention, and Figure 2 is a diagrammatic illustration of two liquid-liquid contactors in series and associated recovery equipment for carrying out a second embodiment of the invention.

Referring to Figure 1, a hydrocarbon mixture comprising a major proportion of propylene and propane and a small amount of propyne is introduced through conduit 2 to liquid-liquid contactor 4. Within the contactor the propylene containing mixture is contacted countercurrently with dimethylformamide solvent introduced thereto through conduit 40. Any conventional type of contactor can be used, such as for example a packed tower, a tray tower, a baffle tower or the like. The overhead or raffinate stream from contactor 4 comprises substantially pure propane which is removed through conduit 6, cooler 8 and yielded from the system. The solvent, having absorbed therein substantially all of the propylene and propyne, passes as extract from the bottom of the contactor through conduit 10 and is introduced to extractive distillation tower 12. This tower is operated under conditions of temperature and pressure whereby a portion of the extract is vaporized, heat for this purpose being provided by reboiler 13 in the bottom of the tower. By virtue of the relative volatilities of the propylene and propyne in the dimethylformamide solvent, propylene is preferentially released and vaporized, passing upwardly through tower 12. At a point above the feed point, namely through conduit 46, dimethylformamide is introduced to the tower and passes downwardly countercurrent to the rising vapor. Propyne is absorbed in the dimethylformamide, thus further purifying the propylene vapor. In order to remove any entrained dimethylformamide the propylene vapors, before passing from the extractive distillation tower are contacted with liquid propylene introduced to the tower through conduit 22. Sufficient scrubbing action is provided by the liquid propylene to remove substantially all of the solvent from the vapors. Thus, the material passing overhead from the extractive distillation tower through conduit 14 is substantially pure propylene. The overhead vapor is condensed in condenser 16 and introduced to accumulator 18. Material withdrawn from the accumulator passes through pump 20 with a portion being returned to tower 12 through conduit 22, as previously described, and the remainder being passed from the system through conduit 24.

The extract which remains after separation of the propylene is removed from the bottom of tower 12 through conduit 26. This material can be yielded without further treatment through conduit 28 and valve 30, or it can be passed to recovery tower 38 through valve 32 and conduit 34. The recovery tower is a conventional fractionation tower which provides separation overhead through conduit 50 and condenser 52 of a stream rich in propyne, and a bottom stream of dimethylformamide, which is recycled through conduits 42 and 46 to the extractive distillation tower and through conduits 42, 44, and 40 to the liquid-liquid contactor. It is also contemplated in this process to return a portion of the bottoms directly from the extractive distillation tower to the liquid-liquid contactor by opening valve 36.

While the aforedescribed process provides a preferred method of carrying out an embodiment of the invention, this is not intended in any limited sense and it is within the scope of the invention to use various apparatus arrangements and process schemes to effect the purposes of the invention. Thus, for example, the recovery steps which follow the liquid-liquid contacting operation are shown as taking place in a single tower. However, it is within the scope of the invention to effect the same procedures in two or three towers if desired. It is also within the scope of the invention to provide a reflux of purified propylene to the bottom of the liquid-liquid contactor (not shown) to aid in the separation effected therein. Also it is within the scope of the invention to utilize a stripping gas of propylene or propyne in the bottom of the extractive distillation tower (not shown) in addition to the heat supplied thereto.

Should allene be present in the feed mixture along with propyne, this material can also be removed by the process owing to the selectivity of dimethylformamide for diolefins over monoolefins.

In another embodiment of the invention separation and recovery of substantially pure propylene is effected in a two-stage liquid-liquid contacting system, as illustrated by Figure 2. Referring to this figure the propylene rich feed containing propane and a small amount of propyne is introduced through conduit 60 to a first liquid-liquid contactor 62. Within this contactor the feed material is passed countercurrent to dimethylformamide solvent introduced through conduit 107 whereby a separation is effected between propyne and the remaining feed components, a stream rich in propyne and solvent passing from the bottom of the contactor through conduit 70 and a mixture of propylene and propane passing overhead therefrom through conduit 64. The overhead, or raffinate stream, is passed through heater 66 and introduced to a second liquid-liquid contactor 68. In this contactor a further separation is provided, with a stream rich in propane passing overhead through conduit 72, cooler 74 and returning to the bottom of the first liquid-liquid contactor through conduit 82, and an extract containing propylene and dimethylformamide passing from the bottom of the contactor through conduit 84. The latter material is introduced to fractionator 86, which is supplied with heat through a heater 87, wherein separation of substantially pure propylene from dimethylformamide is effected. The dimethylformamide is removed from the fractionator through pump 102, cooler 104 and conduit 106 being returned to contactors 62 and/or 68 through valve 108 and conduit 107 or valve 110 and conduit 109, respectively. The fractionator overhead passes through conduit 88 and condenser 90, the liquid then being received in accumulator 92. Effluent from the accumulator passes through pump 94 and is divided into three portions with one portion being returned to the fractionator as reflux through conduit 98, a second portion being returned to the bottom of contactor 68 through conduit 100 and the remaining portion being yielded through conduit 96.

The extract from the first liquid-liquid contactor 62, comprising propyne, dimethylformamide and propane is introduced to stripper 112 for the recovery of dimethylformamide. Heat for the stripping operation is provided by reboiler 126. Dimethylformamide separated in this operation passes from the bottom of stripper 112 through pump 128 and cooler 130 and is returned to the liquid-liquid contactors for use as an absorbing medium. The stripper overhead, comprising propane and propyne is removed through conduit 114 and condenser 116 passing into accumulator 118. This material is removed from the accumulator through pump 120 with a portion being returned to the stripper through conduit 122 as reflux and the remainder being yielded through conduit 124. As shown in the drawing, the raffinate from the second liquid-liquid contactor 68 can be diverted in part to stripper 112 through valves 76 and 78.

The following data is presented in illustration of applications of the aforedescribed embodiments of the invention on a commercial scale.

*Example I*

```
Flows:                                                      Lb./hr.
  Propylene-rich feed (2)_____    5,333
    Composition:                                 Wt. percent
      Propylene _____ 60.0
      Propane _____ 39.0
      Propyne _____  1.0
  Dimethyl formamide to contactor (40)_____              7,840
  Contactor overhead (6)_____              2,136
    Composition:                                 Wt. percent
      Propane _____  4.7
      Propylene _____ 95.3
  Feed to extractive distillation tower (10)_____          11,037
    Composition:                                 Wt. percent
      Propylene _____ 28.2
      Propyne _____  0.4
      Propane _____  0.5
      Dimethylformamide _____ 70.9
  Dimethylformamide to extractive distillation
    tower (46) _____            500
    Composition:                                 Wt. percent
      Propylene _____  1.0
      Dimethylformamide _____ 99.0
  Propylene yield (24) _____            3,054
    Composition:                                 Wt. percent
      Propylene _____ 98.6
      Propane _____  1.4
  DMF recovery tower overhead (50) _____              143
    Composition:                                 Wt. percent
      Propyne _____ 37.0
      Propylene _____ 63.0
Temperatures:                                                 ° F.
  Liquid-liquid contactor (4)—
    Top _____        40
    Bottom _____        50
  Extractive distillation tower (12)—
    Top _____       100
    Bottom _____       300
  DMF recovery tower (38)—
    Top _____       100
    Bottom _____       330
Pressures:                                                   P.s.i.g.
  Liquid-liquid contactor (4)_____          300
  Extractive distillation tower (12)_____          220
  DMF recovery tower (38)_____            5
```

*Example II*

```
Flows:                                                      Lb./hr.
  Propylene-rich feed to contactor A (60)_____           5,333
    Composition:                                 Wt. percent
      Propane _____ 39
      Propylene _____ 60
      Propyne _____  1
  Feed to contactor B (64)_____              5,383
    Composition:                                 Wt. percent
      Propane _____ 42
      Propylene _____ 58
  Contactor A extract (70)_____              3,687
    Composition:                                 Wt. percent
      Propane _____  1.1
      Propylene _____  2.4
      Propyne _____  1.5
      Dimethylformamide _____ 95.0
  Contactor B raffinate (72) _____              2,432
    Composition:                                 Wt. percent
      Propane _____ 96.3
      Propylene _____  3.7
  Contactor B extract (84)_____             10,110
    Composition:                                 Wt. percent
      Propylene _____ 30.5
      Dimethylformamide _____ 69.3
      Propane _____  0.2
```

Flows—Continued

| | |
|---|---|
| Dimethylformamide to contactor A (132 and 106) | 3,524 |
| Composition: Wt. percent | |
| Propane ---- 0.6 | |
| Dimethylformamide ---- 99.3 | |
| Propyne ---- 0.1 | |
| Dimethylformamide to contactor B (106) | 7,070 |
| Composition: Wt. percent | |
| Propylene ---- 1.0 | |
| Dimethylformamide ---- 99.0 | |
| Bottom reflux to contactor A (82) | 213 |
| Composition: Wt. percent | |
| Propane ---- 95.8 | |
| Propylene ---- 4.2 | |
| Bottom reflux to contactor B (100) | 302 |
| Composition: Wt. percent | |
| Propylene ---- 99.4 | |
| Propane ---- 0.6 | |
| Fractionator overhead (88) | 3,342 |
| Composition: Wt. percent | |
| Propylene ---- 99.3 | |
| Propane ---- 0.7 | |
| Propylene yield (96) | 3,040 |
| Composition: Wt. percent | |
| Propylene ---- 99.3 | |
| Propane ---- 0.7 | |
| Stripper net overhead (124) | 2,349 |
| Composition: Wt. percent | |
| Propane ---- 92.6 | |
| Propyne ---- 7.4 |

Temperatures: °F.
- Contactor A (62)—
  - Top ---- 50
  - Bottom ---- 60
- Contactor B (68)—
  - Top ---- 30
  - Bottom ---- 40
- Fractionator (86)—
  - Top ---- 100
  - Bottom ---- 310
- Stripper (112)—
  - Top ---- 100
  - Bottom ---- 330

Pressures: P.s.i.g.
- Contactor A (62) ---- 300
- Contactor B (68) ---- 300
- Fractionator (86) ---- 230
- Stripper (112) ---- Atmos.

Having thus described the invention by providing specific examples thereof, it is to be understood that no undue restrictions or limitations are to be drawn by reason thereof and that many modifications and variations are within the scope of the invention.

I claim:

1. A method for recovering an olefin hydrocarbon from a hydrocarbon mixture comprising an olefin, a paraffin and an alkyne having similar boiling points which comprises contacting said mixture with dimethylformamide, recovering an extract rich in olefin and alkyne, subjecting said extract to contact with additional solvent and extractive distillation, and recovering a substantially pure olefin product.

2. The method of claim 1 in which the hydrocarbon mixture comprises propane, propylene and propyne.

3. The method of claim 1 in which the hydrocarbon mixture comprises butane, butene, and butyne.

4. The method of claim 1 in which the hydrocarbon mixture comprises pentane, pentene, and pentyne.

5. A method for recovering an olefin hydrocarbon from a hydrocarbon mixture comprising an olefin, a paraffin and an alkyne having similar boiling points which comprises contacting said mixture in a first zone with dimethylformamide, recovering an extract rich in olefin and alkyne, introducing the extract to a second zone wherein said extract is stripped to remove olefin, the olefin is contacted with additional solvent to absorb alkyne therefrom and then scrubbed with liquid olefin to remove entrained solvent, and recovering a substantially pure olefin product.

6. The method of claim 5 in which the hydrocarbon mixture comprises propane, propylene and propyne.

7. The method of claim 5 in which the hydrocarbon mixture comprises butane, butene, and butyne.

8. The method of claim 5 in which the hydrocarbon mixture comprises pentane, pentene, and pentyne.

9. A method for recovering an olefin hydrocarbon from a hydrocarbon mixture comprising an olefin, a paraffin and an alkyne having similar boiling points which comprises contacting said mixture with dimethylformamide, recovering a raffinate rich in olefin and paraffin, subjecting said raffinate to a second contact with dimethylformamide, recovering an olefin rich extract from said second contact and fractionating said olefin rich extract to provide a substantially pure olefin product.

10. A method for recovering an olefin hydrocarbon from a hydrocarbon mixture comprising an olefin, a paraffin, and an alkyne having similar boiling points which comprises contacting said mixture in a first contacting zone with dimethylformamide, recovering a raffinate rich in olefin and paraffin and an extract rich in propyne, subjecting said raffinate to a second contact with dimethylformamide in a second contacting zone, recovering from said second contact a paraffin-rich raffinate and an olefin-rich extract, introducing the said propane-rich raffinate to the first contacting zone in contact with the extract leaving said zone, introducing the olefin-rich extract from said second contact to a fractionating zone and recovering a substantially pure olefin product.

11. The method of claim 10 in which the hydrocarbon mixture comprises propane, propylene and propyne.

12. The process of claim 11 in which the extract from the first contacting zone is passed to a stripping zone wherein dimethylformamide is recovered and the recovered dimethylformamide and the dimethylformamide from the fractionation zone are returned to said contacting zones, wherein liquid-liquid contacting is effected.

13. The method of claim 10 in which the hydrocarbon mixture comprises butane, butene, and butyne.

14. The method of claim 10 in which the hydrocarbon mixture comprises pentane, pentene, and pentyne.

15. A method according to claim 5 wherein a portion of the residue from the stripping of said extract in said second zone is returned directly to liquid-liquid contacting in said first zone, and the remaining portion of said residue is stripped to remove alkyne.

References Cited in the file of this patent

UNITED STATES PATENTS

| | | |
|---|---|---|
| 2,159,434 | Frey | May 23, 1939 |
| 2,391,102 | Patterson | Dec. 18, 1945 |
| 2,405,905 | Schindler | Aug. 13, 1946 |
| 2,408,010 | Wadley et al. | Sept. 24, 1946 |
| 2,484,305 | Mayland et al. | Oct. 11, 1949 |
| 2,508,723 | Mayland et al. | May 23, 1950 |
| 2,515,217 | Hachmuth | July 18, 1950 |
| 2,652,439 | Neuhart et al. | Sept. 15, 1953 |
| 2,690,417 | Schalit et al. | Sept. 28, 1954 |
| 2,736,756 | Elgin | Feb. 28, 1956 |
| 2,779,458 | Nelson | Jan. 29, 1957 |